Feb. 20, 1973 E. LEGLER 3,717,826

VARIABLE REACTANCE CIRCUIT

Filed Aug. 20, 1971

Inventor:
Ernst Legler
by James C. Wray
Attorney

United States Patent Office 3,717,826
Patented Feb. 20, 1973

3,717,826

VARIABLE REACTANCE CIRCUIT

Ernst Legler, Seeheim, Germany, assignor to Fernseh G.m.b.H., Darmstadt am Alten Bahnhof, Germany Filed Aug. 20, 1971, Ser. No. 173,387
Claims priority, application Germany, Aug. 31, 1970, P 20 43 074.4
Int. Cl. H03b 3/04
U.S. Cl. 331—117 R 8 Claims

ABSTRACT OF THE DISCLOSURE

A variable control voltage $U_R$ is applied between the bases of two differential-amplifier output transistors, which are connected in cascade to an input transistor. One of the output transistors is connected to provide a current to an input point by feedback. The input point is connected through a capacitor or a resistor and a capacitor to the input transistor. An LC parallel circuit is connected between the input point and ground. Current from the LC circuit is applied to the input point, and, because of the capacitor, the current thus applied to the input transistor is phase displaced in comparison with the current at the input point. By adjusting the control voltage across the output transistors, the effective capacitance in parallel with the LC reactance circuit is varied.

BACKGROUND OF THE INVENTION

The invention is an adjustable reactance circuit such as those employed to adjust the frequency of oscillators. There are already many types of such reactance circuits, which use either vacuum tubes or transistors. Reactance control circuits employing the so-called variable capacitance diodes are also well known.

The known types of such circuits, which use tubes or transistors, adjust the reactance by controlling the plate conductance. The adjustable range is rather limited, because the alternating-current voltage level must remain small. On the other hand, the variable capacitance diodes, of the type available in the market under the name "Varicap," have the disadvantage that they require relatively large direct-current volage. Furthermore, the relationship between control potential and capacity is not linear.

SUMMARY OF THE INVENTION

This invention introduces a new type of reactance control circuit in which the disadvantages and difficulties mentioned above are not encountered.

The reactance circuit that we invented consists of an input transistor and two differential-amplifier output transistors connected in cascade. By the use of appropriate coupling circuitry between the input point of the reactance control circuit and an input electrode of the input transistor, the current applied to the input transistor is displaced in phase by 90° in comparison with the current at the input point. Another characteristic of the invention is that the collector output of one of the two output transistors is connected to the input point; and that a control potential is applied between the base electrodes of the differential-amplifier output transistors.

It is preferable to use a capacitor in the coupling circuitry which is connected between the input point and the emitter of the input transistor in the cascade. The direct-current fed to this emitter should come through an emitter resistor from an external power source. The base of this transistor should have no signal current, and may include a Zener diode to eliminate any trace of signal. This same base should have a direct-current potential that is only a fraction of the potential applied to the emitter from the external power source.

The invention is presented below diagrammatically and is explained on the basis of these diagrams, whereby all nonessential details are omitted. All other parts and/or current paths are shown in the diagrams, each part retaining in all diagrams a given letter and/or sign.

DESCRIPTION OF THE PREFERRED EMBODIMENTS

Figures 1, 2:
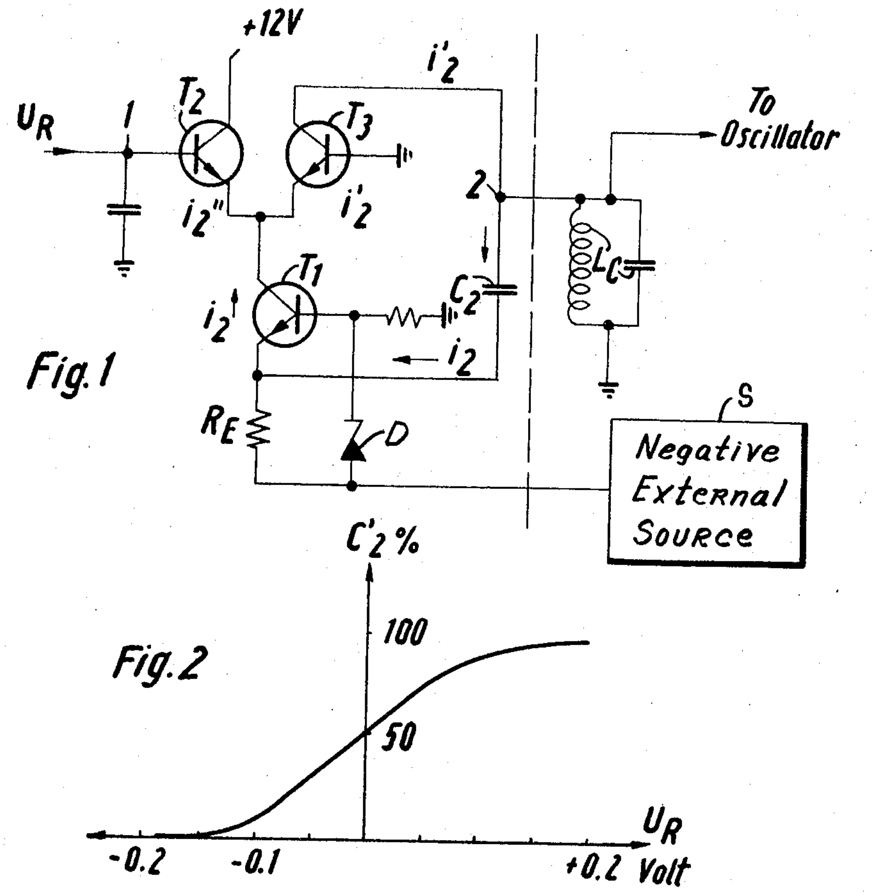
FIG. 1 illustrates the circuitry of the new reactance control circuit.
FIG. 2 is a diagram, explanatory of the way the circuit functions.

The circuitry shown in FIG. 1 consists of three transistors, $T_1$, $T_2$ and $T_3$ connected in cascade. Transistor $T_1$ is an input transistor and has an A.C. input applied to an emitter from an input point 2. From the collector of the input-transistor $T_1$, current is fed to the emitter of the transistors $T_2$ and $T_3$, which work in base connection.

The control potential $U_R$ is applied between the base electrodes of transistors $T_2$ and $T_3$, through line 1, that is to say between line 1 connected to the base of transistor $T_2$ and ground as connected to the base of transistor $T_3$. The oscillating circuit LC to be controlled consists of inductance L and capacitance C, and it is connected to provide the A.C. input to the emitter of transistor $T_1$ through the input-point 2 and through capacitor $C_2$. The direct current applied to the emitter of $T_1$ comes from external sources through resistor $R_E$.

If the input resistance of the emitter of transistor $T_1$ is small, (which resistance, at an emitter current of 3 ma., will be approximately 10 ohms) then a purely capacitive current flows from the oscillating circuit LC to transistor $T_1$ through capacitor $C_2$. This current, as it comes from the collector of transistor $T_1$, is split between transistors $T_1$ and $T_3$, depending on the value of the control potential $U_R$. The current flowing through transistor $T_2$ is called $i_2''$. The current flowing back to oscillator circuit LC from transistor $T_3$ is designated $i_2'$. This current $i_2'$ can in one extreme case be equal to $i_2$ and in another extreme case be equal to zero.

If the case were $i_2'=i_2$, no current is taken from the oscillating circuit LC, which means that the additional capacitance is equal to zero. In the case where $i_2'=0$ ($i_2''=i_2$), the capacitive current taken from the oscillating circuit equals $i_2$, which means that the condenser $C_2$ becomes operative at its full capacitance value in parallel with the circuit LC. By giving the control potential varying values between −0.2 v. and +0.2 v., the effective additional capacitance $C_{2\ eff}$ can be made to vary between 0% and 100% of the intrinsic value of capacitor $C_2$.

FIG. 2 shows the relationship. On the abscissa, the control potential $U_R$ is expressed in volts. On the ordinate, the effective part $C_2'$ of the additional capacitance $C_2$ is expressed in percent. The relationship between the two is given by a curve that has an S-form and includes a portion of good linearity.

Figure 3:
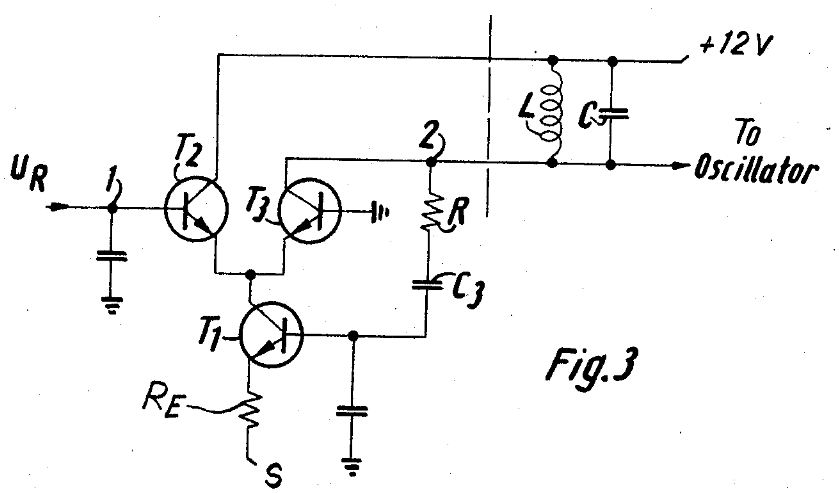
FIG. 3 shows another embodiment of the reactance control circuit shown in FIG. 1.

FIG. 3 shows another version of the circuit shown in FIG. 1. Whereas in circuit 1, a positive capacitance is established by controlling the emitter electrode of transistor $T_1$, in circuit 3 the reactance control circuit serves as a negative capacitance in comparison to the impedance LC. This is achieved by controlling the base electrode through an RC component which brings about a phase displacement of 90°. In order for the phase displacement to become 90°, the resistance (in ohms) must be large in comparison to the practically nonexistent resistance of the capacitor. The capacitor $C_3$ serves only for purposes of separation.

The other parts necessary to the circuit and the power source are only schematically shown; such a part is for instance the Zener diode D connected to the base of transistor $T_1$. Capacitors short point 1 and the base of transistor $T_1$ to ground to eliminate undesired higher frequency signals.

In principle, the invention can be applied to all reactance control circuits. In other words, the effective reactance can be controlled not only through a positive capacitance as shown, but also to achieve control through other reactance values such as a negative capacitance or a positive or negative inductance. But the circuitry for a positive capacitance is more simple and so, generally, more preferable.

The invention offers important advantages, especially where phase-comparison circuits are used to adjust and synchronize oscillators.

That which is claimed is:

1. An adjustable reactance circuit having an inductor and capacitor connected in parallel and having an input point connected to one end of the inductor and capacitor, two output transistors each having first and second current electrodes and a base electrode, the first electrode of one output transistor being connected to the input point, the second electrodes of the output transistors being connected together, and a source of variable control potential being connected between the base electrodes of the two output transistors, input transistor having first and second electrodes and a base electrode, the first electrode of the input transistor being connected to the second electrodes of the output transistors, means for supplying a potential being connected to the base electrode and one other electrode of the input transistor, and a connecting capacitor connected between one electrode of the input transistor and the input point.

2. The circuit apparatus of claim 1 wherein the connecting capacitor is connected between the input point and the second electrode of the input transistor.

3. The circuit apparatus of claim 1 further comprising a resistor connected in series with the connecting capacitor between the base electrode of the input transistor and the input point.

4. An adjustable reactance circuit comprising:

(A) an input transistor having a signal input terminal, (B) two output transistors connected in differential-amplifier configuration and mutually connected in cascade with the input transistor, and each having a base terminal, (C) means for applying a variable control potential to the differential-amplifier between the base terminals of the respective output transistors, (D) an input point, (E) means for connecting the output of the differential-amplifier to the input point, (F) a reactive circuit element having an intrinsic reactance value for connecting the input point to the signal input terminal, whereby the effective reactance of the adjustable reactance circuit as measured from the input point an be varied as a function of the intrinsic reactance value by adjustment of the variable control potential.

5. A circuit according to claim 4, wherein the reactive circuit element is a capacitor.

6. A circuit according to claim 4, where in the reactive circuit element is a series connection of a capacitor and a resistor.

7. A circuit according to claim 4, wherein the input transistor has a base connected to a source of constant voltage.

8. A circuit according to claim 4 further comprising a parallel connection of an inductor and a capacitor between the input point and a point of fixed potential.

References Cited

UNITED STATES PATENTS

| | | | |
|---|---|---|---|
| 3,641,462 | 2/1972 | Fujimura | 331—177 R X |
| 3,393,379 | 7/1968 | Sanford | 331—177 R X |
| 3,553,609 | 1/1971 | Edge | 333—80 T |

ROY LAKE, Primary Examiner

S. H. GRIMM, Assistant Examiner

U.S. Cl. X.R.

331—177 R; 333—80 T